Figure 2:
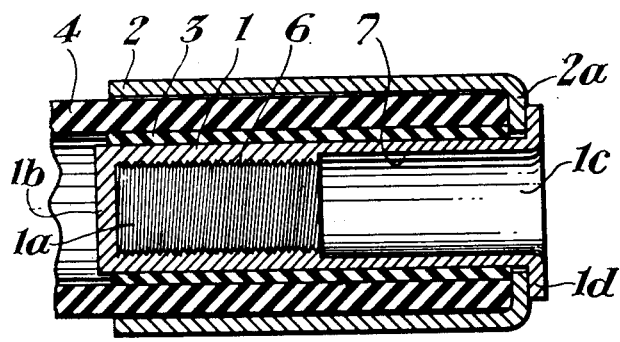

Jan. 30, 1951  R. H. CUBITT  2,539,894
DRY SURFACE CONTACT RECTIFIER ASSEMBLY
Filed May 1, 1948

INVENTOR.
Roger Harry Cubitt.
BY
HIS ATTORNEY

Patented Jan. 30, 1951

2,539,894

UNITED STATES PATENT OFFICE 2,539,894

DRY SURFACE CONTACT RECTIFIER ASSEMBLY

Roger Harry Cubitt, London, England, assignor by mesne assignments, to The Union Switch and Signal Company, Swissvale, Pa., a corporation of Pennsylvania Application May 1, 1948, Serial No. 24,452
In Great Britain July 18, 1947

9 Claims. (Cl. 175—366)

This invention relates to rectifier assemblies of the kind in which a number of rectifier elements of the dry surface contact type are arranged in a stack or column within a hollow tube of insulating material, electrical contact with the stack or column being effected through the ends of the tube.

In assemblies of this type it has hitherto been found difficult to obtain a suitable electrical contact with the rectifier elements while, at the same time, insuring an efficient seal which will prevent the ingress of moisture. It is thus an object of this invention to provide suitable means for making electrical contact with the rectifier elements within the tube, which means also enables the end of the tube to be efficiently sealed and according to the principal feature of the invention a blind screw fastening device of the kind known by the registered trade mark "Rivnut" has fitted over the outside of it a rubber sleeve or washer and is then inserted in the end of the tube and "upset," with the result that the rubber sleeve or washer is firmly gripped against the inside of the tube, a suitable terminal screw then being screwed into the threaded end of the fastening device which makes electrical contact with the stack of rectifier elements within the tube.

In order to guard against a tendency of the tube to split when the fastening device is "upset," a metal ferrule may be fitted over the end of the tube, the expansion of the tube due to the "upsetting" of the device causing a firm grip between the two.

In one embodiment of the invention the shank of a closed ended "Rivnut" with a long grip length is inserted in a thin metal ferrule one end of which has been spun over to form a shoulder against which the head of the "Rivnut" abuts. The inside diameter of the ferrule is such that it is a close but easy fit over the end of the tube within which the rectifier elements are to be mounted. A rubber sleeve is then fitted over the shank of the "Rivnut." The inside diameter of this rubber sleeve is such that it will fit the shank of the "Rivnut" as closely as possible consistent with being able to fit it over the latter while assembled to the ferrule. The outside diameter of the sleeve is such that, when assembled to the "Rivnut," it will fit snugly inside the tube. The assembly is then fitted to the end of the tube so that the latter is disposed between the ferrule and the rubber sleeve, the end of the tube, the shoulder of the ferrule and the head of the "Rivnut" abutting one against the other. The "Rivnut" is then "upset" in the usual manner and it is found that, due to its being of long grip length, two bulges are formed, one at the base of the threaded portion and the other gripping the shoulder of the ferrule to the head of the "Rivnut" thus firmly riveting the two together. The two bulges distort the rubber sleeve, forcing it against the inside of the tube, thus effectively sealing the tube against the ingress of moisture, and also, to a lesser extent, expand the tube outwards firmly to grip the inside of the ferrule. Electrical connection with the rectifier elements within the tube is made by screwing a suitable terminal screw into the threaded portion of the "Rivnut," the closed end of which is maintained in contact with the column of rectifier elements by means of a suitable spring.

It will be appreciated that, by suitable design of the shank of the "Rivnut," the position at which the bulge or bulges occur as a result of "upsetting" may be predetermined and a suitable seal may be made with a shorter sleeve or washer gripped by a suitably placed bulge in one position only.

I shall describe one form of apparatus embodying my invention, and shall then point out the novel features thereof in claims.

Figure 1:
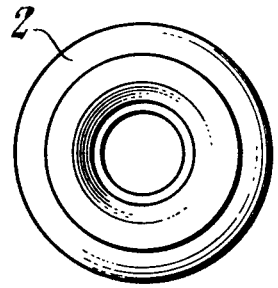
Figure 3:
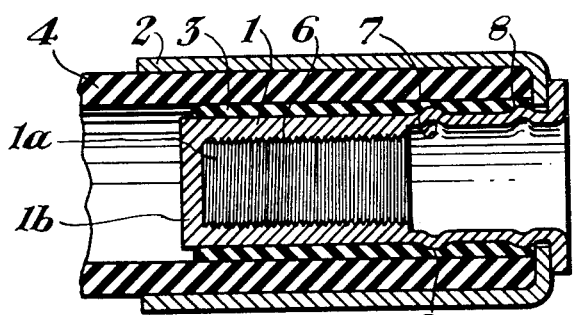
Figure 4:
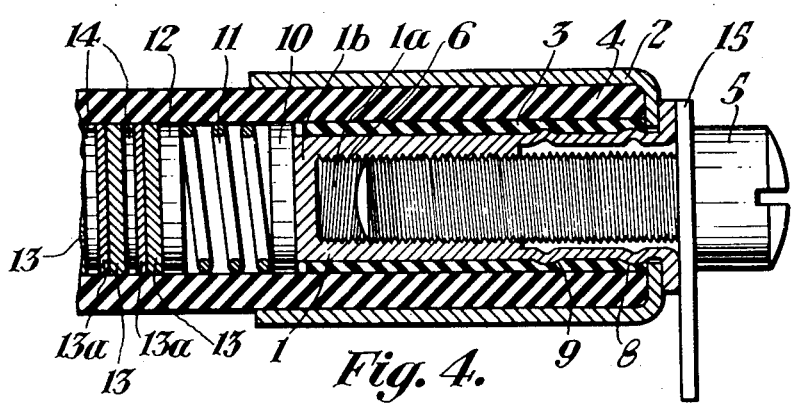

In the accompanying drawings, Fig. 1 is an end view, and Figs. 2, 3, and 4 are longitudinal sectional views showing one form of apparatus embodying my invention. In Fig. 2, the apparatus is shown before the hollow metallic cylinder, designated as a "Rivnut," has been distorted by upsetting; in Fig. 3, the apparatus is shown after the metallic cylinder has been distorted by upsetting; and in Fig. 4, the apparatus is shown with a rectifier stack in a tube of insulating material, and with a terminal screw inserted into the threaded portion of the metallic cylinder the end of the tube has been sealed by after distorting a portion of the metallic cylinder.

Similar reference characters refer to similar parts in each of the views.

Referring first to Figs. 1 and 2, one end $1a$ of a hollow metallic cylinder or "Rivnut" $1$ is closed by an end wall $1b$. The other end $1c$ of cylinder $1$ is open. The closed end of cylinder $1$ has a threaded interior surface $6$ which is of smaller diameter than the interior surface $7$ of the open unthreaded end of cylinder $1$. The open end $1c$ of cylinder $1$ is provided with an exterior shoulder or head $1d$.

A reinforcing ferrule $2$, which may be of metal, and which has an interior shoulder $2a$ at one of its ends, is placed to surround cylinder $1$, with the outer surface of shoulder 2a of ferrule 2 abutting against the shoulder 1d of cylinder 1.

A sleeve 3, which may be of rubber or of other suitable resilient material, is fitted over the outside of cylinder 1.

Cylinder 1, ferrule 2, and sleeve 3, as thus assembled, are applied to an end of a tube 4 of insulating material, so that the tube is between the sleeve and the ferrule.

Cylinder 1 is then distorted or upset to compress sleeve 3 into sealing engagement with cylinder 1 and tube 4 as shown at 8 and 9 in Figs. 3 and 4. By this operation, tube 4 is also expanded into tight engagement with the inside of ferrule 2.

In Fig. 4, with the end of tube 4 sealed, as just described, by distortion of cylinder 1 against sleeve 3 which in turn forces tube 4 against ferrule 2, a pressure disk 10 is shown in engagement with end wall 1b of cylinder 1. Disk 10 applies pressure to a second pressure disk 12 through a coil spring 11. Disk 12 in turn applies pressure to a rectifier stack comprising a plurality of rectifier units each of which embodies two layers 13 and 13a, and spacer layers 14 between the adjacent rectifier units. A connector 15 is applied to the head of cylinder 1 by a suitable terminal screw 5 which engages the threaded portion 6 of cylinder 1.

Electrical connection with the rectifier stack is therefore made through disk 12, coil spring 11, disk 10, cylinder 1, terminal screw 5, and connector 15.

It follows that apparatus embodying my invention serves not only to hermetically seal the end of tube 4 but also to make electrical connection between the parts within tube 4 and other parts external to tube 4.

Although I have herein shown and described only one form of apparatus embodying my invention, it is understood that various changes and modifications may be made therein within the scope of the appended claims without departing from the spirit and scope of my invention.

Having thus described my invention, what I claim is:

1. In a rectifier assembly in which a rectifier is arranged within a tube of insulating material, the combination comprising, a hollow metallic cylinder having one end closed and the other end open, a rubber sleeve fitted around said metallic cylinder, said metallic cylinder arranged closed end inward within an end of said tube of insulating material, and a portion of the wall of said metallic cylinder expanded to seal said end of said tube of insulating material.

2. In a rectifier assembly in which a rectifier is arranged within a tube of insulating material, the combination comprising, a hollow metallic cylinder one end of which is closed and has a threaded interior surface which is of smaller diameter than the interior surface of the other end of said tube which is open, a sleeve of resilient material fitted around said metallic cylinder, said metallic cylinder arranged within an end of said tube of insulating material with said closed end of said metallic cylinder connected with said rectifier, a portion of said metallic cylinder adjacent its open end expanded to seal said end of said tube of insulating material, and a terminal device screwed into said threaded portion of said metallic cylinder for making an electrical connection with said rectifier.

3. In a rectifier assembly in which a rectifier is arranged within a tube of insulating material, the combination comprising, a hollow metallic cylinder having one end closed and the other end open, a sleeve of resilient material fitted around said metallic cylinder, and said metallic cylinder fitted closed end inward within an end of said tube of insulating material for sealing said end of said tube of insulating material.

4. In a rectifier assembly in which a rectifier is arranged within a tube of insulating material, the combination comprising, a hollow metallic cylinder having one end closed and the other end open, a sleeve of resilient material fitted around said metallic cylinder, said metallic cylinder fitted with its closed end connected with said rectifier within an end of said tube of insulating material for sealing said end of said tube of insulating material, and terminal means connected with said metallic cylinder for making an electrical connection with said rectifier.

5. In a rectifier assembly in which a rectifier is arranged within a tube of insulating material, the combination comprising, a hollow metallic cylinder having one end closed and the other end open, a reinforcing ferrule fitted around an end of said tube of insulating material, a sleeve of resilient material fitted around said metallic cylinder, and said metallic cylinder fitted closed end inward within said end of said tube of insulating material for sealing said end of said tube of insulating material and locking said ferrule onto said end of said tube of insulating material.

6. In electrical apparatus in which an electrical device is arranged within a tube of insulating material, the combination comprising, a hollow metallic cylinder having one end closed and the other end open, a sleeve of resilient material fitted around said metallic cylinder, and said metallic cylinder arranged with its closed end connected with said electrical device and fitted within an end of said tube of insulating material for sealing said end of said tube of insulating material and serving as electrical connection means for said electrical device.

7. In a rectifier assembly including a plurality of rectifier elements arranged in a stack within a tube of insulating material, the combination comprising, two hollow metallic cylinders one for each end of said tube and each of said cylinders having a closed end and an open end, each of said cylinders inserted closed end inward within the corresponding end of said tube and its closed end connected with a corresponding end of said stack of rectifier elements, and each of said cylinders fitted for sealing the corresponding end of said tube and provided with terminal means fitted into its open end for serving as electrical connection means for the corresponding end of said rectifier stack.

8. In an assembly of electrical apparatus in which an electrical device is arranged within a tube of insulating material, a reinforcing ferrule fitted over an end of said insulating tube, a metallic plug fitted within said end of said tube and connected with a corresponding portion of said electrical device, and a portion of said metallic plug distorted for locking said ferrule to said plug and for hermetically sealing said end of said tube.

9. In an assembly of electrical apparatus in which an electrical device is arranged within a tube of insulating material, a hollow metallic cylinder having one end closed and the other end open, said cylinder sealed closed end inward into one end of said tube and connected with said electrical device to serve as an electrical connector for said device, and terminal means inserted into the open end of said cylinder for making electrical connection through said cylinder with said electrical device.

ROGER HARRY CUBITT.

REFERENCES CITED

The following references are of record in the file of this patent:

UNITED STATES PATENTS

| Number | Name | Date |
|---|---|---|
| 1,898,321 | Strobel | Feb. 21, 1933 |
| 2,042,542 | Masnou | June 2, 1936 |
| 2,314,104 | Richards et al. | Mar. 16, 1943 |
| 2,423,091 | Fiore et al. | July 1, 1947 |